United States Patent [19]

Lunn

[11] 3,880,837

[45] Apr. 29, 1975

[54] 6-HYDRAZONO PENICILLINS AND METHOD OF PREPARATION THEREOF

[75] Inventor: William H. W. Lunn, Indianapolis, Ind.

[73] Assignee: Eli Lilly and Company, Indianapolis, Ind.

[22] Filed: Nov. 15, 1972

[21] Appl. No.: 306,958

[52] U.S. Cl. .......... 260/239.1; 260/141; 260/306.7; 260/306.8 F; 424/271
[51] Int. Cl. ...................... A61k 21/00; C07d 99/14
[58] Field of Search ............. 260/141, 239.1, 306.7, 260/306.8 F

[56] References Cited
OTHER PUBLICATIONS

Brunwin et al., J. Chem. Soc. (London), Chemical Communications, pages 192–193 (1972).
Hauser et al., Helv. Chim. Acta, Vol. 50, pages 1327–1334 (1967).

*Primary Examiner*—Floyd D. Higel
*Attorney, Agent, or Firm*—William C. Martens, Jr.; Everet F. Smith

[57] ABSTRACT

6-Hydrozono penicillins having the formula

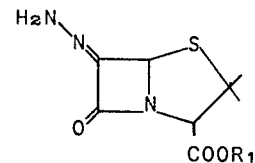

are prepared from 6-(N-nitroso) penicillins by reaction with triphenylphosphine. They are convertible to 6-diazopenicillins by reaction with a mild oxidizing agent selected from the group consisting of manganese dioxide and lead tetraacetate. These in turn can be used to produce active antibiotics.

8 Claims, No Drawings

6-HYDRAZONO PENICILLINS AND METHOD OF PREPARATION THEREOF

BACKGROUND OF THE INVENTION

This invention relates to 6-hydrazonopenicillins and to a process for their preparation. 6-Hydrazonopenicillins are useful as intermediates in the preparation of 6-diazopenicillins.

The benzyl ester of 6-hydrazonopenicillin (benzyl 6-hydrazonopenicillanate) is mentioned in the recent publication of D. M. Brunwin and G. Lowe, Journal of the Chemical Society - Chemical Communications (1972), 192.

Methods for preparing 6-diazopenicillin esters are described in D. Hauser and H. P. Sigg, Helv. Chim. Acta., 50, (1967), 1327. One method involves the reaction of an N-nitroso penicillin ester with silica. The other disclosed method involves the reaction of an ester of 6-aminopenicillanic acid with nitrous acid generated from sodium nitrite. The general and specific features of this latter method are also described in I. McMillan and R. J. Stoodley, J. Chem. Soc. (C), (1968), 2533 and J. P. Clayton, J. Chem. Soc. (C), (1969), 2123.

6Diazopenicillins are useful as intermediates in the preparation of antibiotics. South African published Patent Application 71/3228 teaches a new class of penicillin antibiotics, each of which has as its preparative source a 6-diazopenicillin ester.

Thus, the process of this invention, being directed to the preparation of 6-hydrazonopenicillin esters, which are convertible to 6-diazopenicillin esters, is highly useful in the ultimate production of antibiotic substances.

Although the method of preparation of the 6-hydrazonopenicillins is from N-nitroso penicillin esters, and utility of the 6-hydrazonopenicillins is grounded in their convertability to 6-diazopenicillins, this overall preparative sequence is entirely distinct from that detailed in Hauser et al., above. The sequence contemplated herein additionally carries the advantage of significantly improved yield of the 6-diazo product over that obtained in Hauser et al.

SUMMARY OF THE INVENTION

This invention is directed to a process for preparing a 6-hydrazonopenicillin having the formula

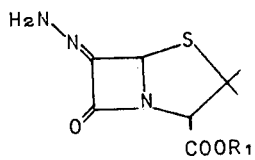

which comprises reacting a compound of the formula

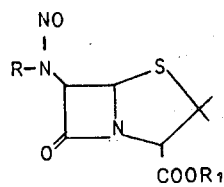

with triphenylphosphine, in which, in the above formulae,

R is an acyl group and $R_1$ is the residue of a carboxy protecting group.

Another embodiment of this invention involves the methyl ester of 6-hydrazonopenicillin as a new compound available from the process aspect of this invention. This compound has the formula

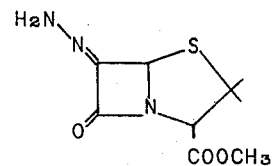

Another aspect of this invention relates to a process for preparing a 6-diazopenicillin having the formula

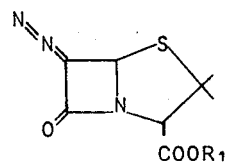

which comprises reacting a 6-hydrazono penicillin ester of the formula

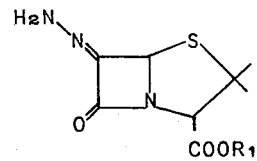

with a mild oxidizing agent selected from the group consisting of manganese dioxide and lead tetraacetate, in which in the above formulae, $R_1$ is the residue of a carboxy protecting group.

DETAILED DESCRIPTION OF THE INVENTION

In the process of this invention, the particular acyl substituent which appears on the nitrogen in the 6-position of the N-nitroso penicillin starting material in general is not critical, the only restriction being the absence in the acyl group represented by R of any groups containing an active hydrogen. By "active hydrogen" is meant any hydrogen which would react with reagents employed in producing the N-nitroso penicillin starting material. These include, for example, hydrogens in hydroxyls, amino groups, amide functions, and the like. Thus, any of a host of acyl groups can be present in accordance with the process of this invention. R can be any of a variety of acyl groups, as exemplified by many of such groups described by the prior art, for example, in Behrens et al., U.S. Pat. Nos. 2,479,295; 2,479,296; 2,479,297; 2,562,407; 2,562,408; 2,562,409; 2,562,410; 2,652,411; and 2,623,876.

Preferred acyl groups in the 6-position of the N-nitroso penicillin starting material include a group of the formula

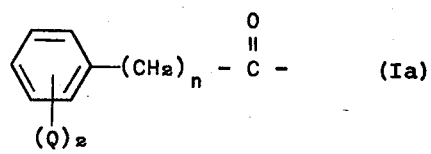

in which n is 0 or an integer from 1 to 5 and each Q independently is hydrogen; $C_1$-$C_3$ alkyl, for example, methyl, ethyl, propyl; $C_1$-$C_3$ alkoxy, for example, methoxy, ethoxy, propoxy; nitro; halogen, for example, chlorine, fluorine, bromine, iodine; or trifluoromethyl; a group of the formula

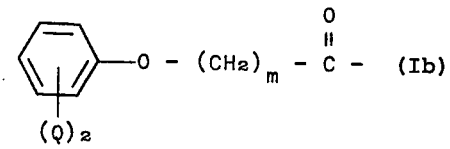

in which m is an integer from 1 to 5 and Q is as defined above; a group of the formula

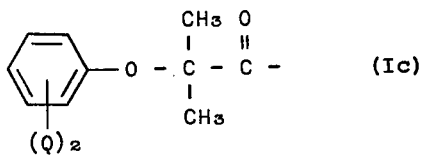

in which Q is as defined above; and a group of the formula

in which $R_2$ is hydrogen or $C_1$-$C_6$ alkyl, for example, methyl, ethyl, propyl, isobutyl, tert-butyl, pentyl, hexyl, etc.

Representative acyl groups defined by Ia are benzoyl, phenylacetyl, 2,6-dimethoxyphenylacetyl, 3-methylphenylacetyl, p-chlorophenylacetyl, m-trifluoromethylphenylacetyl, o-ethoxyphenylacetyl, p-nitrophenylacetyl, β-phenylpropanoyl, γ-phenylbutanoyl, δ-(p-bromophenyl)pentanoyl, ε-(3,4-diethoxyphenyl)hexanoyl, and the like.

Representative acyl groups encompassed by Ib are phenoxyacetyl, β-(p-ethylphenoxy)propanoyl, 2,6-dimethoxyphenoxyacetyl, γ-(phenoxy)butanoyl, β-(3-trifluoromethylphenoxy)propanoyl, 2-bromophenoxyacetyl, γ-(p-cumyloxy)butanoyl, δ-(3-nitrophenoxy)pentanoyl, ε-(3-chloro-4-nitrophenoxy)hexanoyl, and the like.

Illustrative acyl groups defined by Ic are phenoxyα,α-dimethylacetyl, p-methoxyphenoxy-α,α-dimethylacetyl, 2-iodophenoxy-α,α-dimethylacetyl, 3-isopropoxyphenoxy-α,α-dimethylacetyl, 4-trifluoromethylphenoxy-α,α-dimethylacetyl, 3,5-dimethylphenoxy-α,α-dimethylacetyl, and the like.

Acyl groups defined by Id above include formyl, acetyl, propanoyl, butanoyl, isobutanoyl, pivaloyl, tert-butylacetyl, pentanoyl, hexanoyl, heptanoyl, and the like.

As indicated above, $R_1$ denotes a carboxy protecting group. Typically, the carboxy protecting group is the residue of an alcohol. As with the definition of R, $R_1$ can be any such group as long as it is devoid of an active hydrogen. Since the ultimate intended product is the active antibiotic in the form of a free acid or an active salt thereof, it is preferred that $R_1$ can be an ester residue which is easily cleaved, such as by dilute aqueous base, trifluoroacetic acid or hydrogenation in the presence of a palladium or rhodium catalyst on a suitable carrier such as carbon, barium sulfate or alumina, or by reduction with zinc in an acid such as hydrochloric, acetic or formic acid. Nevertheless, within the broad limitations defined hereinabove, the particular nature of the carboxy protecting group is not important, and any of those known in the art can be used. Preferred carboxy protecting group includes, for example, $C_1$-$C_4$ alkyl, 2,2,2-trihaloethyl, 2-iodoethyl, benzyl, p-nitrobenzyl, succinimidomethyl, phthalimidomethyl, p-methoxybenzyl, benzhydryl, $C_2$-$C_6$ alkanoyloxymethyl, phenacyl, or p-halophenacyl, in any of the above of which halo denotes chlorine, bromine, or iodine.

Specific illustrations of the preferred protecting groups of the carboxyl group of the N-nitroso penicillin compound used in the process of this invention as well as of the 6-hydrazono pencillins of this invention include, for example, methyl, ethyl, n-propyl isopropyl, n-butyl, secbutyl, isobutyl, t-butyl, 2,2,2-trichloroethyl, 2,2,2-tribromoethyl, 2-iodoethyl, benzyl, p-nitrobenzyl, succinimidomethyl, phthalimidomethyl, p-methoxybenzyl, benzhydryl, acetoxymethyl, pivaloyloxymethyl, propionoxymethyl, phenacyl, p-chlorophenyacyl, p-bromophenacyl, and the like.

High preferred carboxy protecting groups are methyl, benzyl, p-nitrobenzyl, p-methoxybenzyl, benzhydryl, and 2,2,2-trichloroethyl.

The N-nitroso starting materials in the process of this invention are prepared from the corresponding 6-acylamido penicillin esters. As mentioned above, the only requisite of the particular 6-acylamido penicillin esters which serve as the source of the N-nitroso compound starting materials is that both the R and $R_1$ substituents contain no active hydrogens. Thus, R and $R_1$ must not contain, for example, a hydroxyl function, a primary or secondary amine function, a hydrogen-containing amide function, and the like. The amide function restriction, of course, does not refer to the amide group necessarily present in the original 6-acylamido function since this is the point of reaction in the preparation of the N-nitroso compound.

The conversion of the 6-acylamido penicillin ester to the N-nitroso compound starting material can be accomplished by reacting the easter with $N_2O_4$. The conversion is accomplished by mixing the 6-acylamido penicillin ester and from about 1 to about 10 molar equivalents of $N_2O_4$. At least one mole of $N_2O_4$ per mole of the penicillin ester is required, and generally up to about 5 molar equivalents of $N_2O_4$ are employed. The reaction is carried out at a relatively low temperature, generally from about −30°C. to about 0°C., and preferably from about −20°C. to about −10°C. Typically, a solvent is employed. Any solvent inert to the reactants and amenable to the temperature range at which the reaction is carried out can be employed. Typical solvents include, for example, aromatic hydrocarbons such as toluene, ethylbenzene, cumene, and the like; halogenated hydrocarbons such as carbon tetrachloride, chloroform, chlorobenzene, bromoform, bromobenzene, 1,2-dichloroethane, 1,2-dibromoethane, and the like; esters, such as ethyl acetate, and the like; ethers, such as dioxane, and the like; and any other appropriate inert solvents.

Typically, the reaction is carried out under mildly basic conditions, such as in the presence of a moderately alkaline reagent, such as the salt of a strong base and a weak acid, for example, sodium acetate, potassium acetate sodium borate, and the like. A mixture of the moderately alkaline reagent and $N_2O_4$ in the appropriately selected solvent is prepared. To the prepared $N_2O_4$ solution a solution of the penicillin ester in the selected solvent is added dropwise over a period generally from about 30 minutes to about 1.5 hours, maintaining the mixture at the temperature of reaction, namely from about $-30°C$. to about $0°C$., particularly from about $-20°C$. to about $-10°C$. The reaction mixture is maintained at the reaction temperature for a period of from about 2 to about 10 hours, generally about 3–4 hours, including the period consumed during addition of the penicllin ester to the $N_2O_4$ solution. Isolation of the 6-(N-nitroso)acylamido penicillin ester product can be accomplished by well recognized extraction and recrystallization techniques.

The thereby-produced 6-(N-nitroso)acylamido penicillin ester represents the starting material of the process of this invention. The N-nitroso starting material in accordance with the teaching of this invention is convertible to a novel 6-hydrazono penicillin ester. The novel 6-hydrazono penicillin esters of this invention are prepared from the N-nitroso penicillin compound by reacting the latter with triphenylphosphine. At least an equimolar amount of the triphenylphosphine relative to the N-nitroso penicillin compound is required. Typically, a slight excess of the triphenylphosphine, such as about 1.1 moles per mole of the N-nitroso penicillin is employed. A large excess, such as up to about 10 moles per mole of the N-nitroso penicillin, can be employed, but not to any significant advantage. The reactants are suitably mixed in an appropriate inert solvent, such as any of those mentioned hereinbefore, and are permitted to react at a temperature of from about $0°C$. to about $50°C$. The time of reaction can be over a broad range, typically from about 3 to about 20 hours, with the time of reaction being to some degree inversely dependent upon the temperature of reaction.

Additionally, it has been discovered from it is highly preferred to employ in the reaction mixture an excess, for example, from about 2 to about 50 moles of a $C_1$ to $C_4$ alkanol per mole of N-nitroso penicillin ester. The term "$C_1$ to $C_4$ alkanol" encompasses methanol, ethanol, isopropanol, n-propanol, n-butanol, isobutanol, sec-butanol, and tert-butanol. Highly preferred for this purpose is methanol. It has been discovered that the presence of an alcohol such as methanol in the reaction mixture greatly facilitates the conversion of the N-nitroso penicillin ester to the 6-hydrazono penicillin ester. Although the reaction can proceed without the use of a lower alkyl alcohol, the extent of conversion is greatly diminished by its absence.

Isolation of the 6-hydrazono penicillin ester product can be by any well recognized technique. Typically, the 6-hydrazono penicillin ester product is isolated from the reaction mixture by chromatographic separation. It has been discovered that it is highly desirable in such an isolation technique to employ on the chromatographic column a small amount of a lower alkyl ($C_1$-$C_4$) alcohol, such as methanol, ethanol, isopropanol, t-butyl alcohol, and the like. Isolation of the desired 6-hydrazono penicillin product for some reason is greatly facilitated by the presence of the added alcohol, typically, in an amount of from about 150 to about 750 ml. of alcohol per each mole of the N-nitroso starting material. Generally, the column which is employed is packed with silica or silica gel, although other adsorbents, preferably of slightly acidic nature, can be employed.

The thus-produced compounds of this invention, 6-hydrazono penicillin esters, are readily convertible to corresponding 6-diazo penicillin ester. As pointed out hereinabove, the 6-diazo penicillin esters are useful as intermediates in the preparation of antibiotics.

In carrying out the conversion of the 6-hydrazono penicillin ester to the 6-diazo penicillin ester, the hydrazono compound is dissolved in an appropriate inert solvent, typically any of those mentioned hereinabove. The 6-hydrazono penicillin ester is reacted with a mild oxidizing agent, such as, for example, manganese dioxide, lead tetraacetate, and the like. The oxidizing agent is present in the reaction medium in at least a molar equivalent relative to the 6-hyrazono penicillin ester. Typically from about 1.1 to about 3 moles of the oxidizing agent are employed per mole of 6-hydrazono penicillin ester. The reactants are mixed in the appropriate solvent and reacted at a temperature of from about $-10°C$. to about room temperature, preferably at about $0°C$. The reaction mixture is maintained at the selected temperature for a period of from about 4 to about 10 hours with the particular time of reaction being somewhat dependent upon the temperature at which the reaction is carried out, a higher temperature indicating a reduced reaction time. The thus-formed 6-diazo penicillin ester can be recovered from the reaction mixture typically, first, by filtering off insolubles, such as excess oxidizing agent, from the reaction mixture and then isolating the product by removal of solvent from the reaction mixture filtrate. Since the 6-diazo penicillin compounds tend to be readily decomposed by heat, special precautions should be employed to avoid excessive heat and to store the 6-diazo penicillin under relatively cold conditions. The thus-obtained 6-diazo penicillin ester can be employed in accordance with the teaching of the previously mentioned prior art to prepare an active antibiotic substance.

Preparation of the N-nitroso penicillin ester starting material of the process of this invention can be illustrated by the following specific procedure.

To 300 ml. of chloroform were added 45.1 g. (0.55 mole) of sodium acetate. The mixture was slurried and cooled to $-65°C$. in a dry ice-acetone bath. A 5 molar solution of $N_2O_4$ in chloroform was prepared, and 50 ml. of this solution were then added to the sodium acetate mixture in two 25 ml. portions. Methyl 6-phenoxyacetamido-2,2-dimethylpenam-3-carboxylate (20.4 g.; 0.056 mole) in 50 ml. of chloroform was then added dropwise to the mixture over a 45 minute period maintaining the temperature of the mixture between $-20°C$. and $-10°C$. Upon completion of the addition, the mixture was stirred for 30 minutes, and an additional 25 ml. of the $N_2O_4$ solution were aded. Stirring was continued for 1.5 hours. The mixture was then added slowly to one liter of ice water containing 120 g. (1.2 moles) of potassium bicarbonate and 300 ml. of chloroform. Bubbling occurred, and when the bubbling subsided, the layers were separated, and the aqueous layer was extracted twice with 300 ml. of chloroform. The organic layers were combined, washed twice with 200 ml. of saturated aqueous sodium chloride and dried over sodium sulfate. The solvent was removed, and the residue was crystallized from a mixture of ethyl acetate and hexane to obtain 20.0 g. (91 percent) of methyl 6-(N-nitroso)phenoxyacetamido-2,2-dimethylpenam-3-carboxylate.

The following examples are presented to illustrate the teaching of this invention and are not intended to in any way be limiting upon the scope thereof.

EXAMPLE I

Triphenylphosphine (5.5 g.; 0.021 mole) was dissolved in 250 ml. of dry benzene, and 12.8 ml. of methanol were added. The resulting solution was cooled to about 10°C., and 7.86 g. (0.02 mole) of methyl 6-(N-nitroso)phenoxyacetamido-2,2-dimethylpenam-3-carboxylate were added with stirring, the reaction mixture warming to room temperature over about four hours. Stirring was continued at room temperature overnight. The solvent was then removed in vacuo, and the residue was dissolved in about 25 ml. of a 9:1 mixture of benzene and ethyl acetate to which about 7 ml. of methanol were added. The solution was placed on a chromatography column containing 1200 g. of Davidson silica. Elution was carried out first with 300 ml. of a 9:1 mixture of benzene and ethyl acetate and then with a 8:2 mixture of benzene and ethyl acetate. The following fractions were obtained and combined: A (fractions 5-9)—0.5 g.—no product; B (fractions 21-38)—1.1 g.—some product; C (fractions 29-32)—1.0 g.—some product; D (fractions 33-46)—2.65 g.—product.

Fraction groups B and C were combined and placed on a column comprising 160 g. of silica. Elution was carried out as above to obtain 0.78 g. of product. Total product, methyl 6-hydrazono-2,2-dimethylpenam-3-carboxylate, 3.43 g. (71 percent).

EXAMPLE II

To 5 ml. of dry benzene was added 0.168 g. (0.64 mmoles) of triphenylphosphine. To the resulting solution was added 0.3 ml. of dry ethanol followed by 0.25 g. (0.64 mmoles) of methyl 6-(N-nitroso)phenoxyacetamido-2,2-dimethylpenam-3-carboxylate. The mixture was stirred overnight, and a thinlayer chromatogram (TLC) of the reaction mixture indicated formation of methyl 6-hydrazono-2,2-dimethylpenam-3-carboxylate.

EXAMPLE III

To 10 ml. of chloroform was added 0.487 g. (2 mmoles) of methyl 6-hydrazono-2,2-dimethylpenam-3-carboxylate. The mixture was cooled to about 0°C. in an ice bath, and 0.487 g. of manganese dioxide was added with stirring. Stirring was continued for about two hours, and a TLC of the reaction mixture indicated the presence of starting material. An additional 0.24 g. of manganese dioxide was then added, and stirring was continued for an additional three hours. Filter-aid was added to the reaction mixture, and the reaction mixture was filtered. Solvent was removed from the filtrate at reduced pressure, avoiding heating of the product. A yellow oil (480 mg.) was obtained which showed by NMR analysis a quantitative conversion to methyl 6-diazo-2,2-dimethylpenam-3-carboxylate.

EXAMPLE IV

To 5 ml. of dry benzene were added 243 mg. (1 mmole) of methyl 6-hydrazono-2,2-dimethylpenam-3-carboxylate and 975 mg. (2 mmoles) of lead tetraacetate. The mixture was stirred for about 30 minutes, and 5 ml. of a mixture of water and filter-aid were added. The mixture was extracted with methylene chloride, and the organic layer was washed with water and dried over magnesium sulfate. A yellow oil (50 mg.), shown by NMR to be methyl 6-diazo-2,2-dimethylpenam-3-carboxylate, was recovered.

Additional examples of process conversions and 6-hydrazono penicillin esters available in accordance with this invention are as follows:

2,2,2-trichloroethyl 6-(N-nitroso)phenylacetamido-2,2-dimethylpenam-3-carboxylate to 2,2,2-trichloroethyl 6-hydrazono-2,2-dimethylpenam-3-carboxylate to 2,2,2-trichloroethyl 6-diazo-2,2-dimethylpenam-3-carboxylate;

p-nitrobenzyl 6-(N-nitroso)phenylacetamido-2,2-dimethylpenam-3-carboxylate to p-nitrobenzyl 6-hydrazono-2,2-dimethylpenam-3-carboxylate to p-nitrobenzyl 6-diazo-2,2-dimethylpenam-3-carboxylate.

2,2,2-trichloroethyl 6-(N-nitroso)phenoxyacetamido-2,2-dimethylpenam-3-carboxylate to 2,2,2-trichloroethyl 6-hydrazono-2,2-dimethylpenam-3-carboxylate to 2,2,2trichloroethyl 6-diazo-2,2-dimethylpenam-3-carboxylate;

p-nitrobenzyl 6-(N-nitroso)phenoxyacetamido-2,2-dimethylpenam-3-carboxylate to p-nitrobenzyl 6-hydrazono-2,2-dimethylpenam-3-carboxylate to p-nitrobenzyl 6-diazo-2,2-dimethylpenam-3-carboxylate;

benzyl 6-(N-nitroso-4-trifluoromethylphenyl)acetamido-2,2-dimethylpenam-3-carboxylate to benzyl 6-hydrazono-2,2-dimethylpenam-3-carboxylate to benzyl 6-diazo-2,2-dimethylpenam-3-carboxylate;

t-butyl 6-(N-nitroso-β-phenyl)propionamido-2,2-dimethylpenam-3-carboxylate to t-butyl 6-hydrazono-2,2-dimethylpenam-3-carboxylate to t-butyl 6-diazo-2,2-dimethylpenam-3-carboxylate;

benzhydryl 6-(N-nitroso-4-bromophenoxy)acetamido-2,2-dimethylpenam-3-carboxylate to benzhydryl 6-hydrazono-2,2-dimethylpenam-3-carboxylate to benzhydryl 6-diazo-2,2-dimethylpenam-3-carboxylate;

p-methoxybenzyl 6-(N-nitroso)phenoxy-α,α-acetamido-2,2-dimethylpenam-3-carboxylate to p-methoxybenzyl 6-hydrazono-2,2-dimethylpenam-3-carboxylate to p-methoxybenzyl 6-diazo-2,2-dimethylpenam-3-carboxylate;

phthalimidomethyl 6-(N-nitroso)acetamido-2,2-dimethylpenam-3-carboxylate to phthalimidomethyl 6-hydrazono-2,2-dimethylpenam-3-carboxylate to phthalimidomethyl 6-diazo-2,2-dimethylpenam-3-carboxylate;

2-iodoethyl 6-(N-nitroso)pivalamido-2,2-dimethylpenam-3-carboxylate to 2-iodoethyl 6-hydrazono-2,2-dimethylpenam-3-carboxylate to 2-iodoethyl 6-diazo-2,2-dimethylpenam-3-carboxylate;

succinimidomethyl 6-(N-nitroso)heptanamido-2,2-dimethylpenam-3-carboxylate to succinimidomethyl 6-hydrazono-2,2-dimethylpenam-3-carboxylate to succinimidomethyl 6-diazo-2,2-dimethylpenam-3-carboxylate;

phenacyl 6-[N-nitroso-ε-(2,4-dimethoxyphenyl)]hexanamido-2,2-dimethylpenam-3-carboxylate to phenacyl 6-hydrazono-2,2- dimethylpenam-3-carboxylate to phenacyl 6-diazo-2,2-dimethylpenam-3-carboxylate;

p-chlorophenacyl 6-[N-nitroso-γ-(4-cumyloxy)]butanamido-2,2-dimethylpenam-3-carboxylate to p-chlorophenacyl 6-hydrazono-2,2-dimethylpenam-3-carboxylate to p-chlorophenacyl 6-diazo-2,2-dimethylpenam-3-carboxylate;

acetoxymethyl 6-(N-nitroso-3-nitrophenoxy)-α,α-dimethylacetamido-2,2-dimethylpenam-3-carboxylate to acetoxymethyl 6-hydrazono-2,2-dimethylpenam-3-carboxylate to acetoxymethyl 6-diazo-2,2-dimethylpenam-3-carboxylate;

isopropyl 6-[N-nitroso-(3-chloro-4-nitrophenyl)]acetamido-2,2-dimethylpenam-3-carboxylate to isopropyl 6-hydrazono-2,2-dimethylpenam-3-carboxylate to isopropyl 6-diazo-2,2-dimethylpenam-3-carboxylate;

p-nitrobenzyl 6-(N-nitroso-4-methylphenyl)acetamido-2,2-dimethylpenam-3-carboxylate to p-nitrobenzyl 6-hydrazono-2,2-dimethylpenam-3-carboxylate to p-nitrobenzyl 6-diazo-2,2-dimethylpenam-3-carboxylate.

I claim:
1. A compound of the formula

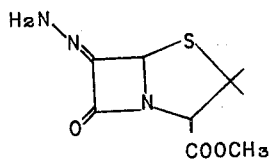

2. A process for preparing a 6-hydrazonopenicillin having the formula

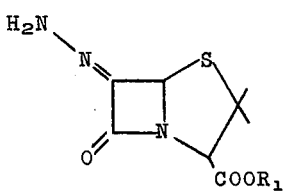

which comprises reacting an N-nitroso penicillin ester of the formula

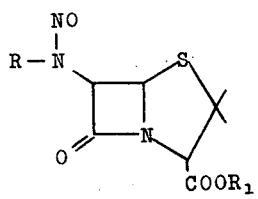

with at least an equimolar amount of triphenylphosphine at a temperature of from about 0° C. to about 50° C., in which, in the above formulae, R is a group of the formula

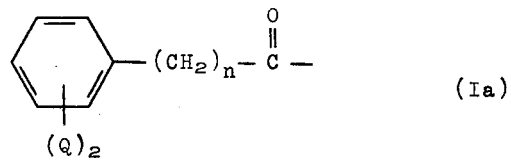

in which n is 0 or an integer from 1 to 5 and each Q independently is hydrogen; $C_1$-$C_3$ alkyl, $C_1$-$C_3$ alkoxy, nitro, halogen, or trifluoromethyl; a group of the formula

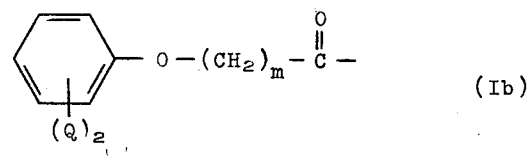

in which m is an integer from 1 to 5 and q is as defined above; a group of the formula

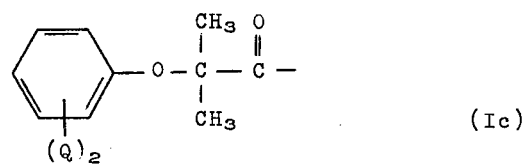

in which Q is as defined above; or a group of the formula

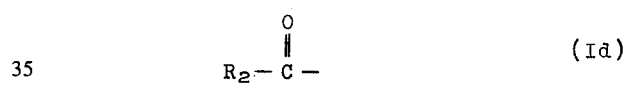

in which $R_2$ is hydrogen or $C_1$-$C_8$ alkyl; and $R_1$ is $C_1$-$C_4$ alkyl, 2,2,2-trihaloethyl, 2-iodoethyl, benzyl, p-nitrobenzyl, succinimidomethyl, phthalimidomethyl, p-methoxybenzyl, benzhydryl, $C_2$-$C_6$ alkanoyloxymethyl, phenacyl, p-chlorophenacyl, or p-bromophenacyl.

3. Process of claim 2, in which $R_1$ is methyl, benzyl p-nitrobenzyl, p-methoxybenzyl, benzhydryl, or 2,2,2-trichloroethyl.

4. Process of claim 3, in which R is phenylacetyl.

5. Process of claim 3, in which R is phenoxyacetyl.

6. Process of claim 1, in which the N-Nitroso penicillin ester is reacted with triphenylphosphine in the presence of a $C_1$-$C_4$ alcohol.

7. Process of claim 6, in which the reaction is carried out in the presence of methanol.

8. Process of claim 7, in which at least 1.1 moles of triphenylphosphine are mixed with each mole of the N-nitroso penicillin ester, and the mixture is reacted at a temperature of from about 0°C. to about 50°C. for from about 3 to about 20 hours in the presence of from about 2 to about 50 moles of methanol per mole of N-nitroso penicillin ester.

* * * * *

UNITED STATES PATENT OFFICE
CERTIFICATE OF CORRECTION

Patent No. 3,880,837          Dated April 29, 1975

Inventor(s) William H. W. Lunn

It is certified that error appears in the above-identified patent and that said Letters Patent are hereby corrected as shown below:

Column 2, line 56, "2,652,411" should read --2,562,411--.

Column 4, line 28, "chlorophenyacyl" should read --chlorophenacyl--.

Column 4, line 48, "easter" should read --ester--.

Column 6, line 9, "ester" should read --esters--.

Column 7, line 29, "38)-1.1 g." should read --28)-1.1 g.--

Column 8, line 26, "2,2,2trichloroethyl" should read --2,2,2-trichloroethyl--.

Column 10, line 38, "$C_1-C_8$ alkyl;" should read --$C_1-C_6$ alkyl;--.

UNITED STATES PATENT OFFICE
CERTIFICATE OF CORRECTION

Patent No. 3,880,837　　　　　　　　　Dated April 29, 1975

Inventor(s) William H. W. Lunn

It is certified that error appears in the above-identified patent and that said Letters Patent are hereby corrected as shown below:

Column 10, line 49, "claim 1, in which the N-Nitroso" should read --claim 2, in which the N-nitroso--.

Signed and Sealed this

Twenty-first Day of June 1977

[SEAL]

Attest:

RUTH C. MASON
*Attesting Officer*

C. MARSHALL DANN
*Commissioner of Patents and Trademarks*